United States Patent
Howlett et al.

(10) Patent No.: US 8,839,331 B2
(45) Date of Patent: Sep. 16, 2014

(54) MULTIPLE REDUCED-BANDWIDTH PROCESSING PATHS TO ACHIEVE A FULL AND CONTINUOUS OUTPUT BAND FOR MULTIPLE CHANNEL CATV UPCONVERSION

(75) Inventors: Colin Howlett, Victoria (CA); Gerald Harron, Martensville (CA); Michael Jaspar, Victoria (CA)

(73) Assignee: Vecima Networks Inc., Victoria, British Columbia (CA)

( * ) Notice: Subject to any disclaimer, the term of this patent is extended or adjusted under 35 U.S.C. 154(b) by 163 days.

(21) Appl. No.: 13/017,078

(22) Filed: Jan. 31, 2011

(65) Prior Publication Data

US 2011/0187936 A1    Aug. 4, 2011

Related U.S. Application Data

(60) Provisional application No. 61/300,699, filed on Feb. 2, 2010.

(51) Int. Cl.
*H04N 7/173* (2011.01)
*H04N 7/16* (2011.01)
*H04N 5/40* (2006.01)

(52) U.S. Cl.
CPC ....................... *H04N 5/40* (2013.01)
USPC .................. 725/118; 725/98; 725/148

(58) Field of Classification Search
USPC .......................... 725/98, 118, 148
See application file for complete search history.

(56) References Cited

U.S. PATENT DOCUMENTS

| | | | |
|---|---|---|---|
| 6,175,719 B1* | 1/2001 | Sarraf et al. | 455/13.1 |
| 6,433,722 B1* | 8/2002 | Gata et al. | 341/144 |
| 7,062,268 B2* | 6/2006 | McKenna | 455/431 |
| 2001/0054974 A1* | 12/2001 | Wright | 341/144 |
| 2005/0041802 A1* | 2/2005 | Gomez et al. | 380/33 |
| 2007/0183308 A1* | 8/2007 | Korobkov et al. | 370/208 |

\* cited by examiner

*Primary Examiner* — Gigi L Dubasky
(74) *Attorney, Agent, or Firm* — Adrian D. Battison; Ade & Company Inc.

(57) ABSTRACT

A method of channel processing is provided wherein multiple reduced-bandwidth "processing blocks" may be combined at RF to allow for the continuous and flexible placement of multiple-channels across the full or partial CATV output band. Each reduced-bandwidth processing block is associated with a fixed-frequency upconversion. In order to allow for continuous agile channel placement, the processing blocks overlap one another in frequency at RF. In the case where it is not necessary that the full CATV band be available to the combined output, the number of required processing blocks and upconversion paths is reduced and individual processing blocks and upconversion paths may be used to cover multiple non-contiguous frequency bands.

7 Claims, 3 Drawing Sheets

MULTIPLE REDUCED-BANDWIDTH PROCESSING PATHS TO ACHIEVE A FULL AND CONTINUOUS OUTPUT BAND FOR MULTIPLE CHANNEL CATV UPCONVERSION

This application claims the benefit under 35 USC 119 of the priority of Provisional Application No. 61/300699 filed Feb. 2, 2010, the disclosure of which is incorporated herein by reference.

This invention relates to multiple reduced-bandwidth processing paths to achieve a full and continuous output band for multiple-channel CATV upconversion. The invention can be applied to both QAM modulated signals and analog modulated signals such as NTSC, PAL etc.

BACKGROUND OF THE INVENTION

Details of the CATV modulator are well known to persons skilled in this art and can be located from many prior documents describing the operation of these arrangements. Extensive details are available in the Technical Reports available from Cable Television Laboratories Inc and particularly the reports entitled Data-Over Cable Service Interface Specifications Modular Headend Architecture which is CM-TR-MHA-V02-081209 copyright 2008; and Data-Over Cable Service Interface Specifications which is CM-TR-CMAP-V01-101222 copyright 2010.

These documents are published and available on line from their web site at Cablelabs.com. The disclosure of the above documents is hereby incorporated by reference.

Traditional approaches to full-band CATV/QAM coverage involve:

a) a single or dual-stage (heterodyne) upconversion architecture, modulating one or more channels from IF (Intermediate Frequency) to RF (Radio Frequency) with fully agile local oscillators (LO) covering the desired output band, or b) a "direct RF" method making use of a digital to analogue converter (DAC) whose sample rate is greater than 2× the desired output bandwidth to absorb the upconversion function into the digital domain, or c) a direct quadrature (IQ) upconversion architecture, making use of a complex modulation to upconvert one or more channels from baseband to RF.

Common challenges or drawbacks to the single or dual-stage upconversion involve isolation of the LO stages, noise, spurious, and return loss performance, size and complexity of circuitry, power consumption and cost.

By absorbing the upconversion into the digital domain, the direct RF approach reduces component complexity and isolation concerns but introduces distortions and noise that fold back from the DAC clock rate by an amount proportional to the highest channel frequency of the system. The DAC clock rate must be pushed out to 2× or 4× the desired output bandwidth to move these components outside of the output band. Additionally, the broadband noise performance of the system is dictated by the noise floor of the DAC itself. Since the DAC output is full-band, no further noise filtering is possible.

Direct IQ improves on power and bandwidth efficiency by making use of both the positive and negative-frequency spectrum through zero-IF image rejection upconversion. In-phase and quadrature-phase signals are separately upconverted and combined at RF to enable the use of the negative-frequency spectrum assembled by the modulator at baseband. As a result, for a given DAC clock frequency and system power, direct IQ achieves a two-to-one increase in efficiency.

SUMMARY OF THE INVENTION

According to the invention there is provided an apparatus for signal modulation for transmission on a CATV cable comprising:

a plurality of ports for receiving input data;

each port having associated therewith a respective one of a plurality of processing blocks each acting as a signal generator and each arranged for generating from the input data signals to be transmitted on the CATV cable to recipients;

each processing block including a respective one of a plurality of DACs so as to generate digital signals;

each generator being associated with a plurality of upconversion paths;

each generator being associated with a first multiplexer arranged to share the output of the DAC of each processor block amongst the associated plurality of upconversion paths;

the associated plurality of upconversion paths being connected to a second multiplexer for combining the outputs of the upconversion paths into a single output.

Preferably continuous full-band coverage is provided by utilizing the summation of multiple reduced-bandwidth upconversion paths.

Preferably each reduced-bandwidth processing block is associated with a fixed-frequency upconversion.

Preferably, in order to allow for continuous agile channel placement, the processing blocks overlap one another in frequency at RF.

Preferably, where it is not necessary that the full CATV band be available to the output, the number of required processing blocks and upconversion paths is reduced and individual processing blocks and upconversion paths may be reused to cover multiple non-contiguous frequency bands.

Preferably the upconversion paths overlap by an amount equal to the smallest bandwidth of channel processing available in the processing block.

Preferably placement of channels within the bandwidth of combined upconversion paths is arbitrary.

Preferably continuous and agile coverage is achieved through overlap of the reduced-bandwidth upconversion paths.

Preferably the reduced bandwidth sub-bands are individually and independently upconverted and added together to form the full band.

Preferably the processor blocks are arranged to operate on analog CATV channels or on QAM channels.

Preferably the reduced bandwidth sub-bands have a smaller frequency range from end to end than the full band allowing for lower sample rate digital to analog conversion and therefore simplified signal processing, lower power and lower cost compared to a traditional full band approach.

Preferably noise improvement is provided by creating the system output from the sum of multiple upconversion paths.

Preferably noise filtering is carried out in the inactive regions of each upconversion path.

This invention therefore presents a method of full-band CATV/QAM coverage utilizing the summation of multiple reduced-bandwidth upconversion paths.

A method of channel processing is provided wherein multiple reduced-bandwidth "processing blocks" may be combined at RF to allow for the continuous and flexible placement of multiple-channels across the full or partial CATV output band.

The method of upconversion (single or dual-stage, direct RF, or direct IQ) is independent of the use of multiple reduced-bandwidth upconversion paths to achieve a full and contiguous output bandwidth for CATV.

In specifying an system as M-N-P, the variable M represents the number of digital-to-analogue conversions that the system is able to make use of. N represents the total number of upconversion paths or bands that cover the desired output frequency range of the system. The variable P refers to the desired contiguous bandwidth of the system, represented as an integer number of upconversion bands. In general, P is equal to one less than M.

Each reduced-bandwidth processing block is associated with a fixed-frequency upconversion. In order to allow for continuous agile channel placement, the processing blocks overlap one another in frequency at RF. In the case where it is not necessary that the full CATV band be available to the output, the number of required processing blocks and upconversion paths is reduced and individual processing blocks and upconversion paths may be used to cover multiple non-contiguous frequency bands.

DETAILED DESCRIPTION

Figure 1:
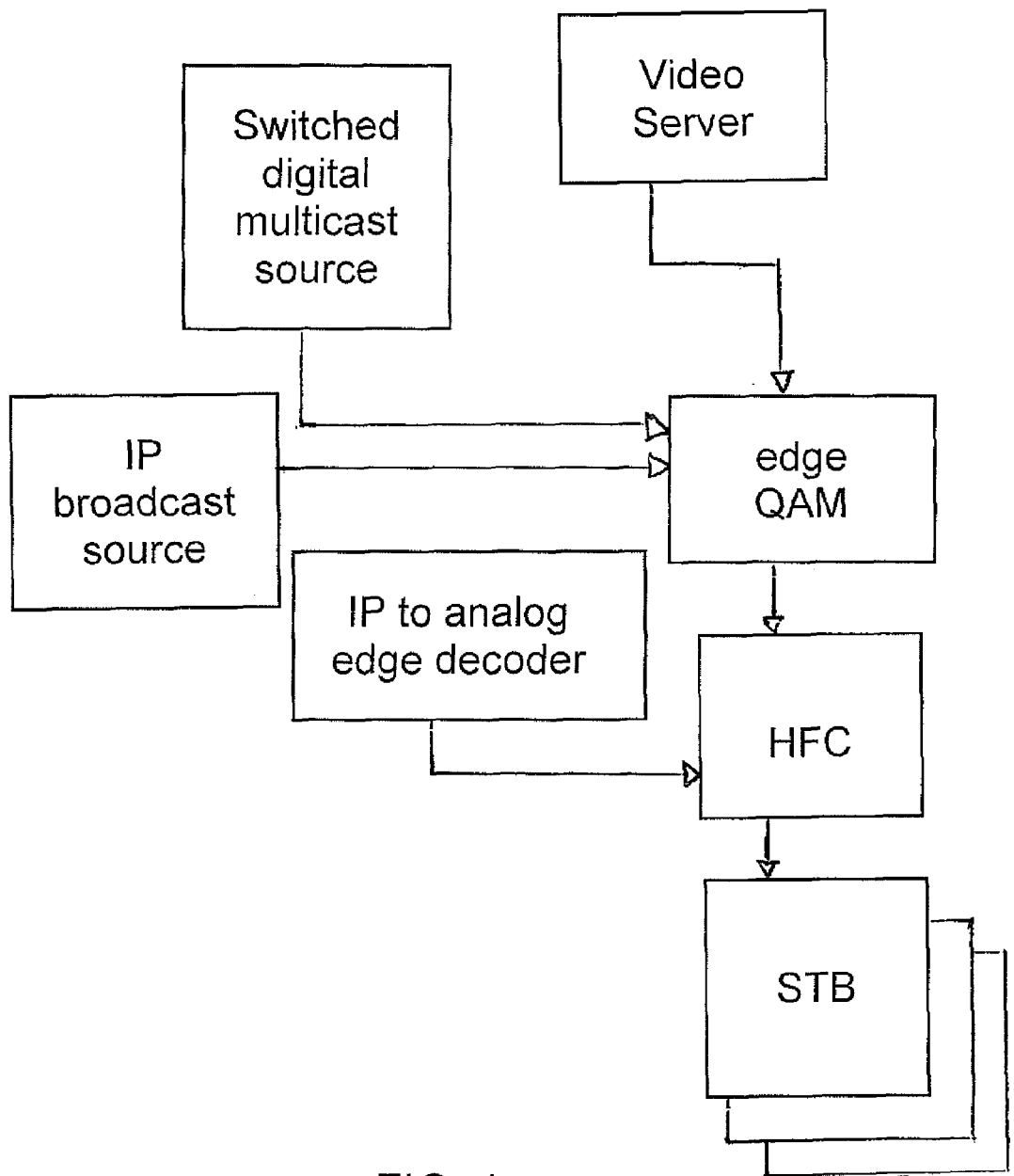
FIG. 1 is a general block diagram of an analog CATV or QAM system such as what would be employed for modulation and upconversion in a cable video headend. MPEG SPTS or MPTS are input from a variety of sources. Some are converted to an analog video channel through an edge decoder in the analog CATV case. Others are encoded and mapped to a digital QAM channel in an edge QAM in the QAM case. In either of the edge decoder or edge QAM, channels are upconverted and output onto a combining network for delivery to customer premises

Reference is made to the above documents and particularly FIG. 5-1 of the first document. This shows MPEG, SPTS or MPTS via UDP/IP multiplexed onto MPTS input to mod/upx into the Headend combining HFC (Hybrid fiber-coax) network which serves set-top boxes in customer homes.

Figure 3:
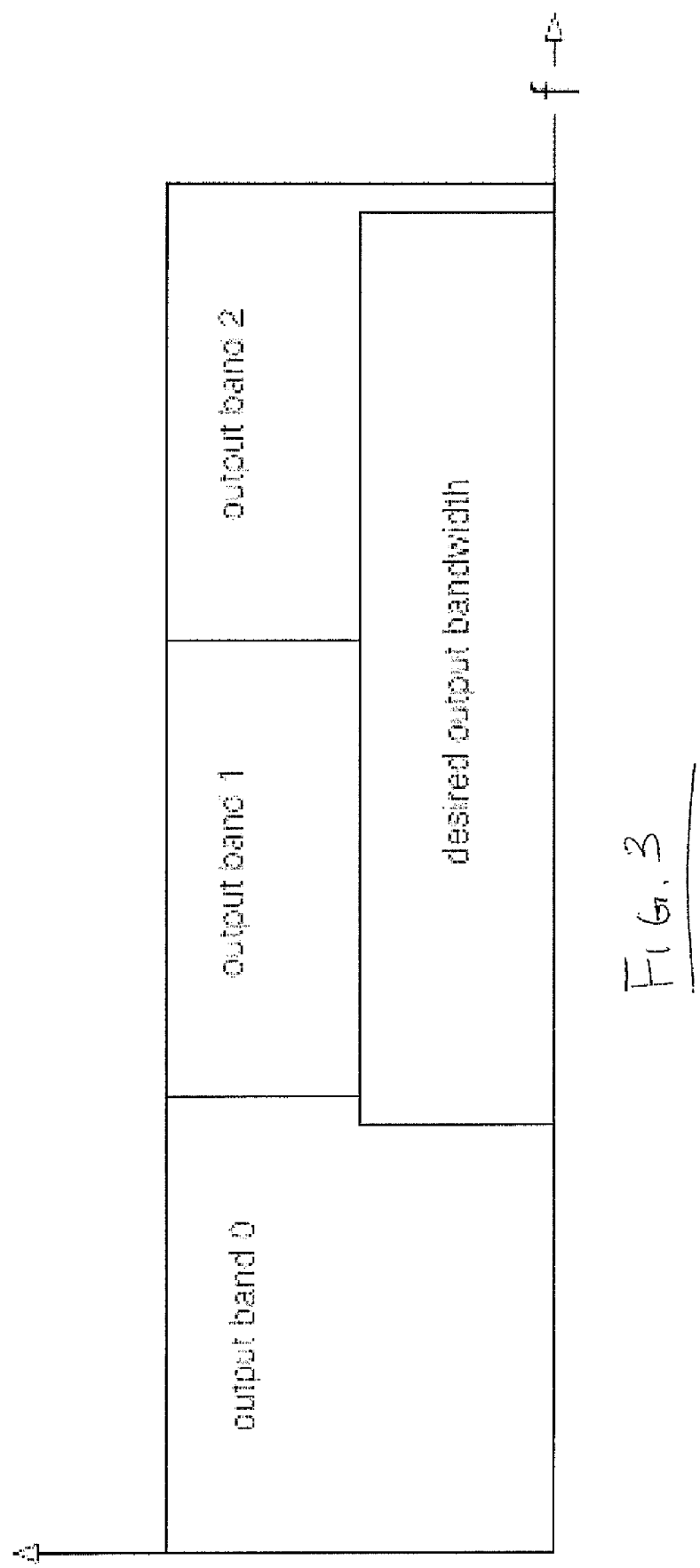
FIG. 3 is a diagram showing an output block that is as wide in frequency as P output bands spanning P+1 output bands.

FIG. 5-3 M-CMTS, reference architecture, from the second document provide a similar disclosure.

FIG. 1 is a general block diagram of an analog CATV or QAM system such as what would be employed for modulation and upconversion in a cable video headend. MPEG, SPTS or MPTS are input from a variety of sources. Some are converted to an analog video channel through an edge decoder in the analog CATV case. Others are encoded and mapped to a digital QAM channel in an edge QAM in the QAM case. In either of the edge decoder or edge QAM, channels are upconverted and output onto a combining network for delivery to customer premises.

Figure 2:
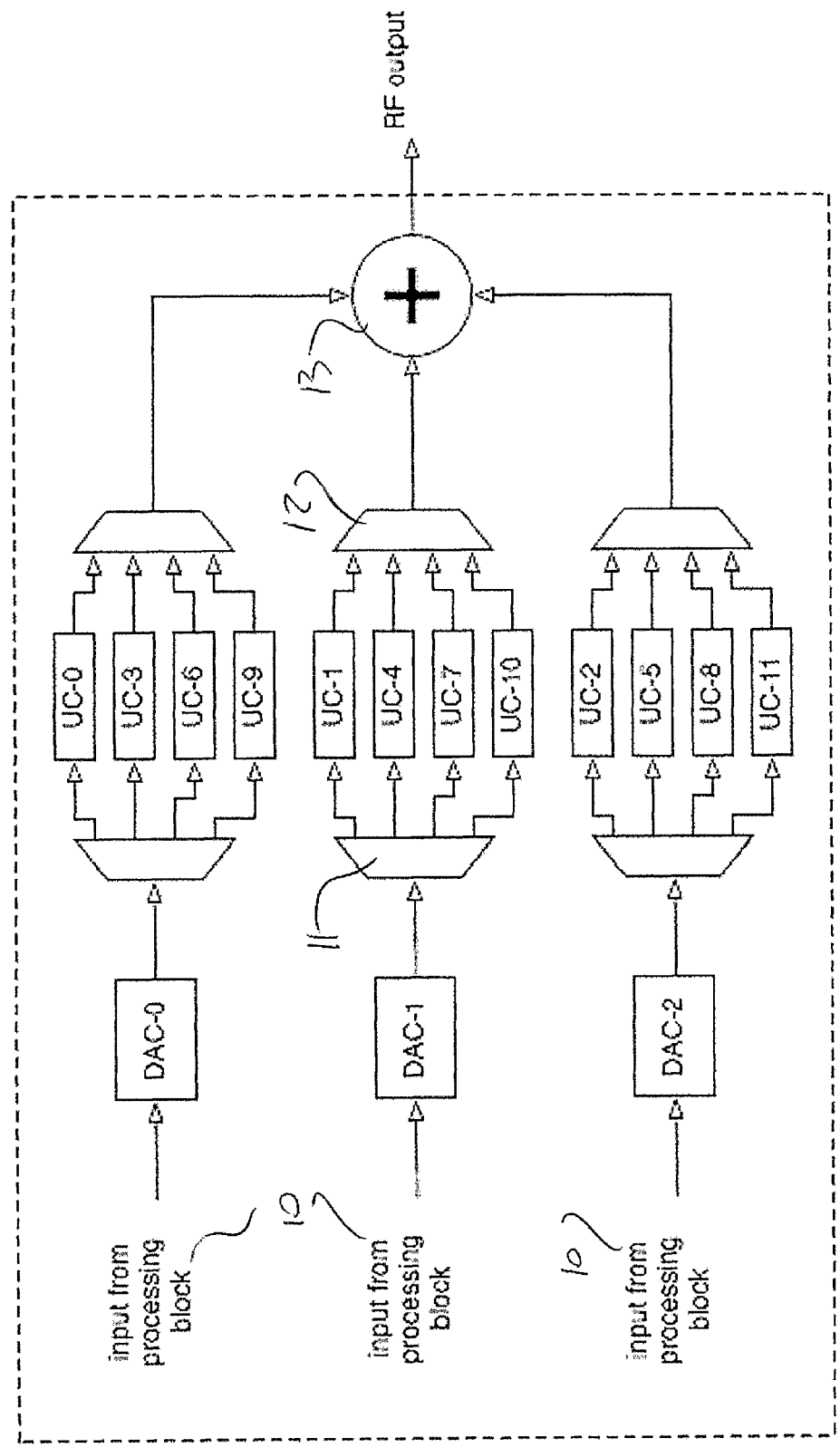
FIG. 2 is a diagram of a 3-DAC, 12-band system which would be specified as M=3, N=12, P=2. in this case, each DAC is assigned four bands. Frequency-consecutive bands are spread across the DACs to allow for continuous agility (P=2) of output.

The apparatus for signal modulation for transmission on a CATV cable shown in FIG. 2 comprises a plurality of ports 10 for receiving input data, each port having associated therewith a respective one of a plurality of processing blocks each acting as a signal generator and each arranged for generating from the input data signals to be transmitted on the CATV cable to recipients, each processing block including a respective one of a plurality of DACs DAC-0, DAC-1 and DAC-2 so as to generate digital signals.

Each DAC is associated with a plurality of upconversion paths with each including a first multiplexer 11 arranged to share the output of the DAC-0 of each processor block amongst the associated plurality of upconversion paths UC-0, UC-3, UC-6 and UC-9.

The upconversion paths UC-0, UC-3, UC-6 and UC-9 are connected to a second multiplexer 12 for combining the outputs of the upconversion paths into a single output. The system is arranged such that:

continuous full-band coverage is provided by utilizing the summation of multiple reduced-bandwidth upconversion paths.

each reduced-bandwidth processing block is associated with a fixed-frequency upconversion.

in order to allow for continuous agile channel placement, the processing blocks overlap one another in frequency at RF.

where it is not necessary that the full CATV band be available to the output, the number of required processing blocks and upconversion paths is reduced and individual processing blocks and upconversion paths may be reused to cover multiple non-contiguous frequency bands.

the upconversion paths overlap by an amount equal to the smallest bandwidth of channel processing available in the processing block.

placement of channels within the bandwidth of combined upconversion paths is arbitrary.

continuous and agile coverage is achieved through overlap of the reduced-bandwidth upconversion paths.

the reduced bandwidth sub-bands are individually and independently upconverted and added together to form the full band.

the processor blocks are arranged to operate on analog CATV channels or on QAM channels.

the reduced bandwidth sub-bands have a smaller frequency range from end to end than the full band allowing for lower sample rate digital to analog conversion and therefore simplified signal processing, lower power and lower cost compared to a traditional full band approach.

noise improvement is provided by creating the system output from the sum of multiple upconversion paths.

noise filtering is carried out in the inactive regions of each upconversion path.

A processing block generates arbitrary blocks of CATV channels representing partially or fully-populated output spectra with a combined bandwidth less-than or equal to the frequency bandwidth of 'P' upconversion bands. The output spectra are selectively assigned to 'P' or more DACs to produce reduced-bandwidth distributions of channels versus frequency.

The available 'M' DACs are each connected to one or more fixed-frequency upconversion paths or "bands." The outputs of the 'M' paths are summed and form the complete upconverted output. Breakdown or selection of how many DACs, sub-bands, and upconversion paths are used is dependent on the selected technologies for each functional block and the specific frequency requirements for the system.

The multiple reduced-bandwidth processing blocks may be made continuously agile through the combination of multiple fixed-frequency upconversion paths or "bands", each with bandwidths greater-than or equal-to the processing block bandwidth. Specifically, for an arbitrary processing block bandwidth, it is possible to have full agile placement of 'P' contiguous blocks of bandwidth by combining the outputs of 'P+1' upconversion paths. Additionally, the upconversion paths must overlap by an amount equal to the smallest bandwidth of channel processing, 1 or more channel widths, available in the processing block.

The distribution of upconversion paths across DACs is as follows. For an M-DAC/N-Band approach, DAC 0 would be connected to bands X=0, M, 2M, and so on for X<N. DAC 1 would be connected to bands Y=1, M+1, 2M+1, and so on for Y<N. The pattern continues for each of the 'M' DACs. The outputs of 'M' DACs summed consecutively at the RF output would form a continuous spectrum of bands 0,1, ..., M−1, or M,M+1, ..., 2M−1, and so on. In this way, all 'M' DACs may be simultaneously employed in order to cover an output bandwidth of 'P+1' bands. As mentioned above, in order to guarantee full agility of an output bandwidth of 'P' contiguous blocks, 'M' should be greater than or equal to 'P+1.'

By reducing the required bandwidth of each path:

Channel processing prior to the DAC is simplified;

The sample rate of system processing is lowered, reducing power and cost;

The DAC clock rate is lowered, reducing power and cost;

Interface rates are reduced, lowering power and complexity.

The above savings in power and cost offset the power and cost increases resulting from the use of multiple DACs and upconversion paths.

By creating the system output from the sum of multiple upconversion paths, noise filtering in the inactive regions of each upconversion path is possible. Assuming ideal filtering and a 2-path (M,N,P)=(2,x,1) system, up to 3 dB noise improvement is possible compared to single upconversion path systems. For a 4-path (M,N,P)=(4,x,3) system, the improvement increases to 6 dB for a given output bandwidth. The filters responsible for noise filtering need not be complex to achieve significant noise advantage in the system. The only area of noise degradation is in the overlap regions of the filters at the breakpoints between upconversion bands.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for signal modulation for transmission on a Cable Television (CATV) cable comprising:
   a plurality of ports for receiving input data;
   each port having associated therewith a respective one of a plurality of processing blocks each acting as a signal generator and each arranged for generating from the input an output containing data signals; and
   a summing device for summing together the outputs from the processing blocks as a single output to be transmitted on the CATV cable to recipients;
   each processing block including a respective one of a plurality of digital to analog converters (DACs) so as to generate as outputs thereof analog or digital communications signals;
   the each processing block comprising a plurality of fixed frequency upconversion paths which are reduced-bandwidth sub-bands of a full CATV band;
   the each processing block comprising a de-multiplexer arranged to share the output of the DAC of the each processing block amongst the plurality of fixed frequency upconversion paths;
   the each processing block comprising a multiplexer for receiving outputs of the plurality of fixed frequency upconversion paths and for combining the outputs of the plurality of fixed frequency upconversion paths into said output of said processing block;
   wherein said single output of said summing device provides continuous full-band coverage;
   wherein said multiplexer and de-multiplexer of the each processing block are configured to provide a fixed routing to send a channel or group of channels through each of the plurality of fixed frequency upconversion paths before being summed at said summing device to said single output;
   and wherein in the each processing block, RF frequency of the each of the plurality of fixed frequency upconversion paths is overlapped with an associated plurality of adjacent fixed frequency upconversion paths to provide continuous agile channel placement.

2. The apparatus according to claim 1, wherein a number of the individual processing blocks and the fixed frequency upconversion paths is reduced and the individual processing blocks and the fixed frequency upconversion paths may be reused to cover multiple frequency bands non-contiguously.

3. The apparatus according to claim 1 wherein the fixed frequency upconversion paths overlap by an amount equal to a smallest bandwidth of channel processing available in the processing block.

4. The apparatus according to claim 1 wherein placement of channels within a bandwidth of combined fixed frequency upconversion paths is arbitrary.

5. The apparatus according to claim 1 wherein the reduced bandwidth sub-bands are individually and independently upconverted and added together to form the full CATV band.

6. The apparatus according to claim 1 wherein the processing blocks are arranged to operate on analog CATV channels or on Quadrature Amplitude Modulation (QAM) channels.

7. The apparatus according to claim 1 wherein the reduced bandwidth sub-bands have a smaller frequency range from end to end than the full CATV band allowing for lower sample rate digital to analog conversion and therefore simplified signal processing, lower power and lower cost compared to a traditional full band approach.

* * * * *